(12) United States Patent
Kurniawati et al.

(10) Patent No.: US 9,633,652 B2
(45) Date of Patent: Apr. 25, 2017

(54) METHODS, SYSTEMS, AND CIRCUITS FOR SPEAKER DEPENDENT VOICE RECOGNITION WITH A SINGLE LEXICON

(71) Applicant: STMicroelectronics Asia Pacific Pte Ltd., Singapore (SG)

(72) Inventors: Evelyn Kurniawati, Singapore (SG); Sapna George, Singapore (SG)

(73) Assignee: STMicroelectronics Asia Pacific Pte Ltd., Singapore (SG)

( * ) Notice: Subject to any disclaimer, the term of this patent is extended or adjusted under 35 U.S.C. 154(b) by 0 days.

(21) Appl. No.: 13/854,133

(22) Filed: Mar. 31, 2013

(65) Prior Publication Data

US 2014/0200890 A1    Jul. 17, 2014

Related U.S. Application Data

(60) Provisional application No. 61/731,992, filed on Nov. 30, 2012.

(51) Int. Cl.
| | |
|---|---|
| G10L 15/07 | (2013.01) |
| G10L 15/14 | (2006.01) |
| G10L 17/04 | (2013.01) |
| G10L 15/00 | (2013.01) |
| G10L 15/06 | (2013.01) |

(52) U.S. Cl.
CPC ............ *G10L 15/144* (2013.01); *G10L 15/00* (2013.01); *G10L 15/06* (2013.01); *G10L 15/07* (2013.01); *G10L 17/04* (2013.01)

(58) Field of Classification Search
None
See application file for complete search history.

(56) References Cited

U.S. PATENT DOCUMENTS 7,657,431 B2 *   2/2010   Hayakawa .................... 704/246
8,099,288 B2 *   1/2012   Zhang et al. ................. 704/275

OTHER PUBLICATIONS

Lee et al "A Voice Trigger System using Keyword and Speaker Recognition for Mobile Devices", 2009 IEEE.*
Martin, "2002 NIST Speaker Recognition Evaluation", 2004.*
(Continued)

*Primary Examiner* — Jialong He
*Assistant Examiner* — Yi-Sheng Wang
(74) *Attorney, Agent, or Firm* — Seed IP Law Group LLP

(57) ABSTRACT

Embodiments reduce the complexity of speaker dependent speech recognition systems and methods by representing the code phrase (i.e., the word or words to be recognized) using a single Gaussian Mixture Model (GMM) which is adapted from a Universal Background Model (UBM). Only the parameters of the GMM need to be stored. Further reduction in computation is achieved by only checking the GMM component that is relevant to the keyword template. In this scheme, keyword template is represented by a sequence of the index of best performing component of the GMM of the keyword model. Only one template is saved by combining the registration template using Longest Common Sequence algorithm. The quality of the word model is continuously updated by performing expectation maximization iteration using the test word which is accepted as keyword model.

13 Claims, 3 Drawing Sheets

(56) References Cited

OTHER PUBLICATIONS

Elhadi et al, "Duplicate Detection in Document and WebPages using Improved Longest Common Subsequence and Document Syntactical Structures", ICCIT/IEEE 2009.*
Hasan et al, "A Study on Universal Backgound Model Training in Speaker Verification" IEEE Trans. ASLP Sep. 2011.*
Rabiner L. et al., "A Tutorial on Hidden Markov Models and Selected Applications in Speech Recognition," Proceedings of the IEEE, 30 pgs., vol. 77, No. 2, Feb. 1989, USA.
Rabiner L. et al., "Automatic Speech Recognition—A Brief History of the Technology Development," 24 pgs., 2004, USA.
Kinnunen T. et al., "An Overview of Text-Independent Speaker Recognition: from Features to Supervectors," Journal of Speech Communications, 30 pgs., vol. 52, Issue 1, Jan. 2010, USA.
Rabiner et al., *Fundamentals of Speech Recognition*, PTR Prentice-Hall, New Jersey, 1993, 271 pages.

\* cited by examiner

TEMPLATE : 1 9 2 8 3 5 4 4 6 4 3 1 5 3
TEST     : 1 9 8 3 4 4   6 5 3 1 5 3
*FIG. 4*
LCS score : 10 (10 sequential matching)
Common Replacement : 4 to 5 vice versa
TEMPLATE : 1 9 2 8 3 5 4 4 6 4 3 1 5 3
TEST     : 1 9 3 8 3 4 4 4 6 4 3 1 4 3
   -1      -0.5           -0.5
Edit Distance score : -2
(5 to 4 is considered common replacement and was penalized lower than 2 to 3).
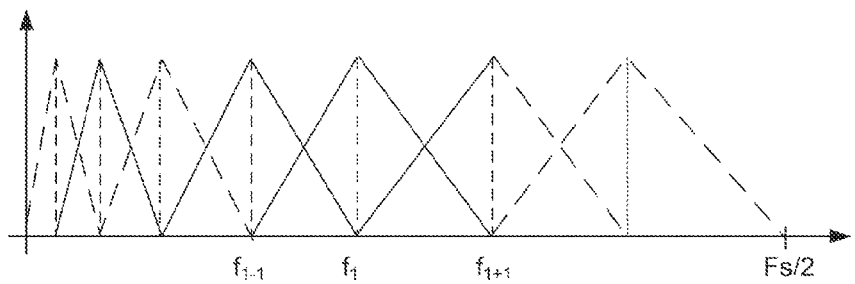
*FIG. 5*
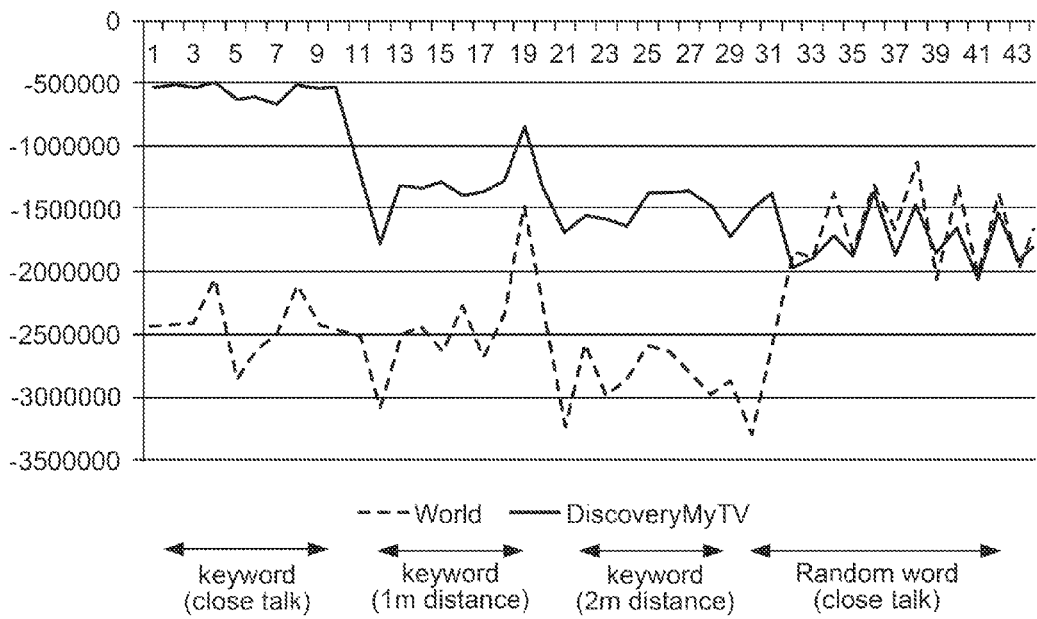
*FIG. 6*

METHODS, SYSTEMS, AND CIRCUITS FOR SPEAKER DEPENDENT VOICE RECOGNITION WITH A SINGLE LEXICON

PRIORITY CLAIM

This application claims priority to provisional patent application No. 61/731,992, filed 30 Nov. 2012, which is incorporated herein by reference.

TECHNICAL FIELD

The present disclosure relates generally to speech recognition systems, and more specifically to speaker-dependent voice recognition in low power applications such as battery-powered mobile devices like smartphones and other electronic devices having a relatively limited storage capacity and computing power.

BACKGROUND

There are two primary approaches of performing speech recognition: 1) template matching based approaches such as Dynamic Time Warping (DTW); and 2) statistical analysis based approaches such as Hidden Markov Model (HMM). In speech recognition, an analog speech signal generated by a suitable sound capture device such as a microphone is sampled and quantized, typically through an analog-to-digital converter operating at an appropriate sampling rate (e.g., 8-20 kHz), to provide a digitized speech signal in the form of digital samples. Short-time spectral properties of the digitized speech signal are then analyzed by successively placing a data window over the digitized speech signal, each data window corresponding to a group of successive digital samples that will be referred to as a "frame" herein. The digital samples in each frame are then analyzed according to the speech recognition approach being utilized.

In a template matching based approach such as DTW typically two sequences that may have temporal variation are compared. During a training phase, speech features such as the Mel Frequency Cepstral Coefficient (MFCC) are generated and stored per frame to serve as a "template". In a testing phase, MFCC's are once again generated per frame for test speech being processed and this MFCC sequence is compared with the stored template MFCC sequence and the one which gives the smallest difference is chosen as the word output.

Circuitry implementing the DTW approach generates a template of a word or phrase, and then when a user speaks a phrase the circuitry generates a sequence representing this speech and compares this sequence to the template. Both the template and the speech have spectral and temporal components and when the comparison yields a close enough match the circuitry determines that an authorized user has spoken the proper phrase, typically referred to a code phrase. With the DTW approach the circuitry, such as a processor and associated memory devices, must store a template for every code phrase that is to be recognized. As a result, the circuitry implementing the DTW approach typically requires a relatively large amount of memory. For example, if a particular application requires the circuitry implementing the DTW to recognize a relatively large number of code phrases then this may require a relatively large amount of memory for storage of the associated templates. The availability or cost of this required memory may be an issue in certain types of electronic devices, such as mobile devices like smartphones.

In statistical analysis based approaches such as HMM, a statistical model of the word to be recognized is built. The general structure of the HMM approach is shown in FIG. 1 and typically it consists of a number of states, each of them with their observable output and their transition probability to the other states. In order to define the required parameters, multiple utterances of the words to be recognized are needed. FIG. 2 shows how a HMM is built for the word "apple." The phonetic pronunciation of this word is shown at the top of FIG. 2 and in HMM and other statistical analysis based approaches typically a subword or a phoneme of the word to be recognized is modeled instead of the whole word so that these subwords or phonemes can then be used to model different desired words.

The HMM is a statistical model that requires a relatively complex training procedure and consequently is typically relatively computationally complex. This complexity may cause circuitry that implements the HMM, such as a processor executing corresponding software, to consume significant amounts of power. As a result this computational complexity and resulting power consumption make the HMM unsuitable for many low power applications, such as in handheld, batter powered devices like smartphones and tablet computers that require the circuitry implementing the HMM to consume relatively low power. For example, in an application where a smartphone is in a sleep or low-power mode of operation any circuitry, including voice recognition circuitry, operable during this mode must of course be low power circuitry or the purpose of the lower-power mode would be defeated.

There is a need for improved methods and circuits for voice recognition in low power applications such as in battery powered devices like smartphones.

SUMMARY

Embodiments reduce the complexity of speaker dependent speech recognition systems and methods by representing the keyword or code phrase (i.e., the word, words, or sound to be recognized) using a single Gaussian Mixture Model (GMM) which is adapted from a Universal Background Model (UBM). Only the parameters of the GMM (i.e., mean, variance and weight for each of the mixtures) needs to be stored. Further reduction in computation is achieved by only checking the GMM component that is relevant to the code phrase template. In this scheme, the code phrase template is represented by a sequence of the indexes of best performing components of the GMM of the code phrase model (CPM). Only one template is saved by combining the registration template using the Longest Common Sequence (LCS) algorithm. The quality of the word model is continuously updated by performing expectation maximization iteration using the test word which is accepted as the code phrase model CPM. An embodiment provides better rejection against non-code phrases compared to a traditional method due to the two step check introduced. It also makes it more resilient to noise compared to DTW due to the Gaussian modelling used. Embodiments can be extended to recognize more code phrases and require much less memory than Dynamic Time Warping (DTW) schemes which save all the MFCC data from the registered code phrase at every frame.

BRIEF DESCRIPTION OF THE DRAWINGS

FIG. 4 illustrates the Longest Common Sequence (LCS) result that is used and the Edit Distance that is an improvement once a distance matrix is obtained from a continuous learning feature.

FIG. 5 shows the triangular filter used on the power spectral density (PSD) during Mel Frequency Cepstral Coefficient (MFCC) extraction to obtain each Mel frequency bin value.

FIG. 6 shows the log likelihood of 43 test words, the first 30 are the code phrase which are pronounced from 3 different distances, and the last 13 are random words.

DETAILED DESCRIPTION

Figure 1:
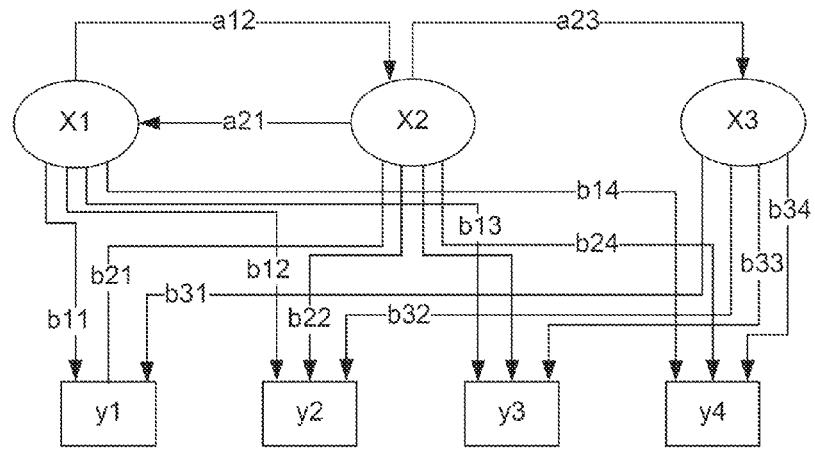
FIG. 1 shows the structure of a Hidden Markov Model used for speech recognition.
Figure 2:
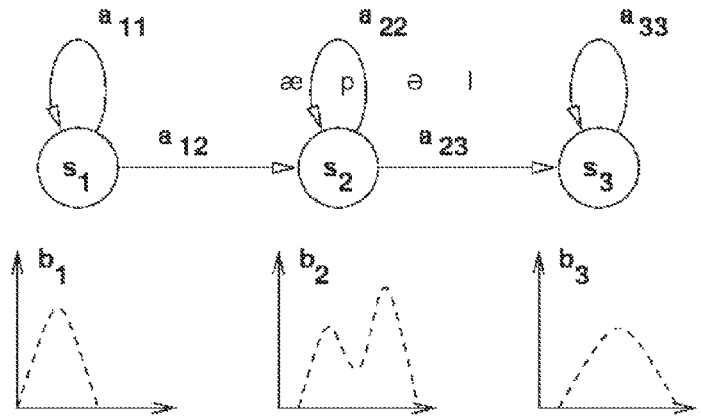
FIG. 2 shows the training process of text dependent speaker recognition where multiple utterances of the word "apple" are needed to construct the statistics of the Hidden Markov Model.

Embodiments described in the present disclosure are directed to circuits and methods of implementing a speaker-dependent speech recognition algorithm that allows an authorized user of a device, such as a smartphone, to activate the device or a mode operation of the device through the utterance of a code phrase, as will be described in more detail below. The code phrase may be a single word, a portion of a word, or any other component of speech. In this way, embodiments function to perform speaker dependent and text dependent speech recognition, thus providing enhanced security for an electronic device implementing the algorithm. The algorithm provides speaker dependent speech recognition by ensuring the speaker is an "authorized" user of the electronic device and also requires the speaker to know the required "code phrase" to be spoken to activate or gain access to the device. In one embodiment, the algorithm operates during a low-power or sleep mode of the electronic device. When an authorized user speaks the proper code phrase, such as "wake up" or "my phone" or "activate," for example, the user is granted access to the device.

More specifically, one embodiment of the present disclosure is a speech recognition algorithm utilizing a combination of a Gaussian Mixture Model (GMM) with Universal Background Model (UBM) and a Longest Common Subsequence or Sequence (LCS) approach. The GMM with UBM portions of the algorithm determine whether the speaker is an authorized user and detect spectral components of the required code phrase while the LCS portion distinguishes the order of the spoken components of the code phrase to ensure the components are uttered in the proper order. For example, assume the code phrase is "my phone." The GMM with UBM portions determine whether an authorized speaker has uttered the words "my" and "phone" but does not determine whether the speaker has uttered the words in the proper order or sequence. The GMM with UBM portion of the algorithm would thus indicate a user is authorized in response to the user speaking either "my phone" or "phone my" while the LCS portion of the algorithm determines whether the authorized speaker has uttered the code phrase in the proper order (i.e., has said "my phone" and not "phone my"). A speaker or user is said to be "authenticated" herein when both portions of the algorithm indicate the user should be granted access to the electronic device (i.e., the GMM with UBM portion indicates the user is authorized and has spoken the required words or components of the code phrase and the LCS portion indicates the words or components were spoken in the proper temporal sequence). The terms "speaker" and "user" are used interchangeably in the present description. In this embodiment the algorithm is configured to recognize one code phrase defined by an authorized user. Only one adapted Gaussian mixture in the GMM is used to represent the code phrase and the LCS portion is utilized to ensure the right sequence of occurrence within the code phrase, where the longest common subsequence is obtained during a registration phase of the algorithm. Only the index of the highest performing GMM component is saved as the LCS portion, as will be described in more detail below.

Speaker dependent voice recognition algorithms according to embodiments in the present disclosure initially receive data about a speech signal that has already been pre-processed. For example, as mentioned above an analog speech signal generated responsive to a user's speech is sampled and quantized to provide a digitized speech signal in the form of digital samples. These digital samples are then pre-processed to provide data that is provided to the speaker dependent voice recognition algorithm. Various front end speech processing of the analog speech signal can be performed as this processing is independent of features used for recognition by the algorithm. In one embodiment, the analog speech signal is pre-processed to generate Mel Frequency Cepstral Coefficients (MFCCs) that are the "features" that are utilized by the speaker dependent voice recognition algorithm to authenticate a speaker, as will be described in more detail below.

In the following description, certain details are set forth in conjunction with the described embodiments to provide a sufficient understanding of the invention. One skilled in the art will appreciate, however, that the invention may be practiced without these particular details. Furthermore, one skilled in the art will appreciate that the example embodiments described below do not limit the scope of the present disclosure, and will also understand that various modifications, equivalents, and combinations of the disclosed embodiments and components of such embodiments are within the scope of the present disclosure. Embodiments including fewer than all the components of any of the respective described embodiments may also be within the scope of the present disclosure although not expressly described in detail below. Finally, the operation of well-known components and/or processes has not been shown or described in detail below to avoid unnecessarily obscuring the present invention.

Figure 3:
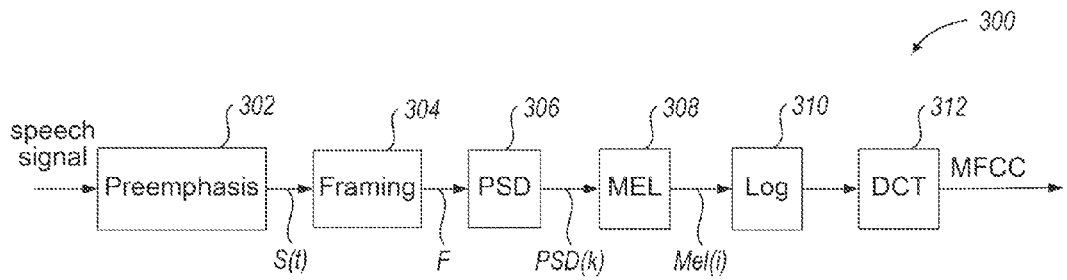
FIG. 3 is a block diagram showing the extraction or generation of MFCCs which are the features processed in one embodiment of the present disclosure.

FIG. 3 is a block diagram of a feature-processing circuit 300 that generates the MFCCs that are the speech features utilized by the speaker dependent speech recognition algorithm according to one embodiment of the present disclosure. The analysis the speaker dependent speech recognition algorithm performs on the speaker's speech is not done on the speech signal itself but on features derived from it, where the features are the MFCCs in the embodiment being described. In FIG. 3 the digitized speech signal is applied to a pre-emphasis circuit 302. Recall the digitized speech signal corresponds to digital samples of the analog speech signal at a suitable sampling rate and quantization of these samples as previously discussed.

The pre-emphasis circuit 302 performs pre-emphasis on the digitized speech signal according to the following equation:

$$S(t)=S_{in}(t)-0.96S_{11}(t-1) \quad (1)$$

where Sin is the input signal and t is the time index. As will be appreciated by those skilled in the art, pre-emphasis is a process performed on audio signals to increase, within a desired frequency band or bandwidth, the magnitude of some frequency components (typically higher frequency components) of the input signal with respect to the magnitude of other frequency components (typically lower frequency components) of the input signal in order to improve the overall signal-to-noise ratio of the input signal. Phenomena such as attenuation distortion may result in these undesirable changes in the magnitudes of frequency components of the input signal, as will be appreciated by those skilled in the art.

The pre-emphasis circuit 302 outputs pre-emphasized speech signal samples in response to the application of Eqn. 1 to the digitized speech signal, and these pre-emphasized speech signal samples are provided to a framing circuit 304. The framing circuit 304 frames the pre-emphasized speech signal samples and subsequent processing is done on a per-frame basis. In one embodiment, each frame is 320 samples in length and the successive frames progress by 160 samples to the next frame. A window is successively placed over the pre-emphasized speech signal samples to define each frame, with the successive placement of the window overlapping the samples. For example, assume the samples start at sample 0 and that the first frame is frame 0. In this situation, frame 0 includes samples 0-319, frame 1 includes samples 160-479, frame 2 includes samples 320-639, and so on, such that the immediately adjacent frames overlap one another. In one embodiment, the sampling rate of the analog speech signal is 16 kHz so each frame is 20 milliseconds long (($1/16$ kHz)×320) and the window effectively shifts by 10 milliseconds to generate the next frame.

The framing circuit 304 then applies the Hamming window to each frame according to the following equation:

$$w(n) = 0.54 - 0.46\cos\left(\frac{2\pi n}{N-1}\right) \quad (2)$$

where N is the frame size (in this example 320) and n is the time index of the window. Each frame thus has the pre-emphasized speech signal samples in the window multiplied by the window function w(n) of Eqn. 2 to generate frames F for subsequent processing.

The framing circuit 304 outputs these frames F to a power spectral density (PSD) circuit 306 that utilizes the Discrete Fourier Transform (DFT) to analyze the frequency content of the signal in each frame. The PSD circuit 306 calculates the PSD of each frame as follows:

$$PSD(k) = \left|\sum_{t=0}^{FFTlen-1} S_{win}(t) \cdot e^{-jtk\frac{2\pi}{FFTlen}}\right|^2 \quad (3)$$

where FFTlen is the length of the Fast Fourier Transform and $S_{win}(t)$ is the signal S(t) of Eqn. 1 after framing by the framing circuit 304 including the application of Eqn. 2 to the samples in each frame. In Eqn. 3 the index k is the frequency index such that PSD(k) gives the power spectral density PSD of the signal $S_{win}(t)$ at the frequency indicated by the index k.

A MEL scale circuit 308 receives the power spectral density values PSD(k) for each frame and adjusts or "warps" the frequencies to thereby perform MEL warping on each frame. The MEL scale is a perceptual scale of sound pitches judged to be equal in distance from one another, as will be appreciated by those skilled in the art. The circuit 308 approximates the desired warping or mapping of the linear frequency scale to the MEL scale using the following equation:

$$mel(f)=2595 \log_{10}(1+f/700) \quad (4)$$

The MEL scale circuit 308 then applies a triangular filter to the power spectral density PSD(k) values as shown in FIG. 5. The MEL scale circuit 308 generates an output according to the following equation:

$$Mel(i) = \sum_{k=0}^{FFTlen/2} W_{i,k} PSD(k) \quad (5)$$

Where the index i is the Mel scale frequency bin and W is the weight of the triangular filter as illustrated in FIG. 5. The linear frequency bins correspond to the index k in Eqn. 5 and are positioned logarithmically on the MEL scale according to Eqn. 4. As a result, after the MEL scale circuit 308 performs the conversion from the linear frequency scale to the MEL scale via Eqn. 5, the index i is the frequency bin index in the MEL domain. According to Eqn. 5 and FIG. 5, each MEL bin i corresponds to a respective triangular filter in FIG. 5 with weight Wi,k. Each triangular filter of FIG. 5 has the same number of points as there are values for the index k.

A logarithmic circuit 310 receives the outputs from the MEL scale circuit 308 and operates in combination with a discrete cosine transform (DCT) circuit 312 to generate the MFCCs for each frame. More specifically, the logarithmic circuit 310 and DCT circuit 312 operate to generate the MFCCs according to the following equation:

$$MFCC(j) = \sum_{i=1}^{Q} \log\left(Mel(i)\cos\left(\frac{j\pi}{Q}(i-0.5)\right)\right) \quad (6)$$

In Eqn. 6 the index j corresponds to the index for the MFCCs per frame, and Q is the index for the MEL frequency bins (i.e., i=1 to Q). For example, Q=24 Mel bins and j=12 MFCCs may be generated per frame. The following describes a training process of the speaker dependent speech recognition algorithm for generating the UBM, word model WM, and template according to one embodiment. The UBM is a representation of the speaker's "acoustic space," which is the speaker's speech pattern. Thus, the UBM is generated based on the speaker's speech pattern by, for example, having the speaker speak into the smartphone, or other electronic device executing the speaker dependent speech recognition algorithm. The speaker would speak into the device for a sufficient period of time, or perhaps read text displayed on the device for this training purpose and generation of the UBM for the speaker. In an embodiment, a single GMM with 64 mixtures is used, with the mixtures made from user speech input.

After going through the front end processing described above with reference to FIG. 3, the features (i.e., the MFCC values) are clustered using the k-means algorithm as follows. First initialization is done where 64 vectors or mixtures are randomly chosen as the initial centroids. The use of 64 mixtures is an arbitrary modeling parameter and may vary in different embodiments. Each of these 64 mixtures includes 12 MFCCs. This is because the single GMM is done on a time scale of one frame, and a set of 12 MFCCs represents a single frame. To generate the UBM from the single GMM, first 64 12 element vectors are randomly chosen as initial centroids/clusters. Alternatively, in another embodiment the initial centroids/clusters may be chosen from training vectors (described below) of the authorized user's speech.

Training vectors (i.e., sets of 12 MFCCs, each set corresponding to a frame) are then generated while the authorized user is speaking, and each of these training vectors is grouped with the one of the initial centroids/clusters that has the closest Euclidian distance to it. Next is a nearest neighbor search where each of the training vectors is grouped with the centroid that has the closest Euclidian distance to it. Then a centroid update is performed and includes, within each centroid, a new mean calculated taking accounts all the vectors that have been grouped with it. The new mean is then set as the new centroid. The operations of the nearest neighbor search and the centroid update are repeated until the distortion falls below a desired threshold.

The mean and variance of each cluster are then calculated, and the weight is calculated as the ratio of the number of frames that belongs to that mixture to the total number of frames used to build the UBM. In one embodiment, the system provides a default UBM in the event that no user speech is available yet during word model building, as will be described in more detail below.

The word model or code-phrase model CPM is adapted from the UBM to give the maximum probability to the code phrase speech and uses expectation maximization iteration, as was explained in more detail above. All the code phrase speech (e.g., the code phrase pronounced five times by the user) is used for this purpose.

The template is a sequence of indexes of the highest performing mixture of the word model from the registration code phrase. A longest common subsequence (LCS) is found between the first two registration code phrases. The result is again compared with the third registration code phrase to obtain the final template. The lowest LCS score between the final template and the 4th and the 5th registration code phrases is used as the threshold of acceptance.

Figure 7:
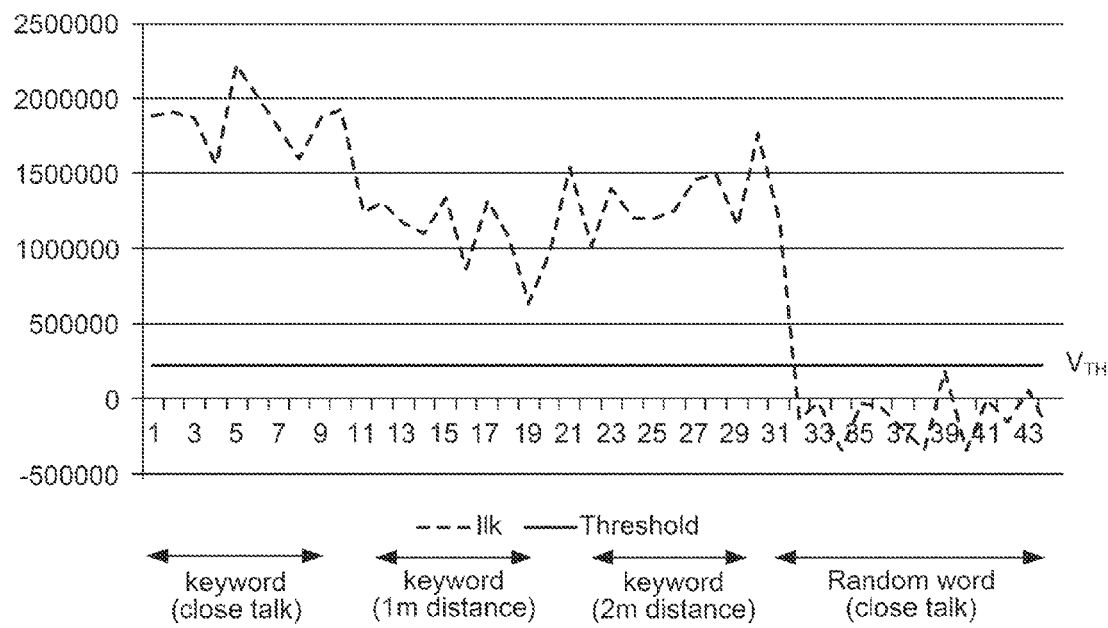
FIG. 7 shows the log likelihood ratio of 43 test words, the first 30 are the code phrase which are pronounced from three different distances and the last thirteen are random words.

The testing process consists of calculating the probability of the test word or code phrase being generated from the word model and from the UBM. If the log likelihood ratio (LLR) is positive, meaning the uttered phrase is likely to be the keyword or code phrase, a second test is performed. FIG. 6 shows the LLR value comparison between the word model (UBM) and the keyword or code phrase model. The test was done at 3 different distances in a quiet room, as illustrated in FIG. 6 where the three distances are seen to be a close distance, approximately one meter, and approximately two meters. FIG. 7 shows the LLR of the keyword or code phrase between the two and illustrates that the algorithm distinguishes the code phrase from random words (far right, below the threshold VTH) at all the distances.

The second check is performed to differentiate a keyword or code phrase that was not pronounced in sequence, for example "TV My" would score the same in terms of likelihood as "My TV" but should be rejected as it is not the correct keyword or code phrase. The algorithm does an LCS analysis between the keyword or code phrase template and the code phrase, and if the LCS value is above a threshold then the word is accepted as the keyword or code phrase. In automatic training when test speech with a good margin of confidence is obtained, automatic training is performed to improve the quality of the word model. This is done by performing more expectation maximization EM iterations on the word model using the obtained sample speech, as discussed above.

The generation of the components for a speaker dependent speech recognition algorithm according to one embodiment of the present disclosure will now be described. The generation of these components includes three phases: 1) training phase; 2) testing phase; and 3) learning phase. The training phase includes building the Universal Background Model (UBM) for the user or speaker along with the adaptation of this model to generate a word model or code-phrase model CPM. The code-phrase model is a GMM of the speaker's acoustic space for the specific code phrase to be recognized and is obtained by modifying the generated UBM for user, as will be described in more detail below.

The UBM is obtained from the normal speech of the authorized user. Such speech is easily obtained while the speaker is using his or her smartphone or other electronic device containing the speaker dependent speech recognition algorithm according to embodiments described in the present disclosure. No transcription is necessary as the acoustic space or UBM of the particular user is being generated at this point. The speech of the authorized user is processed on a per frame basis and the Mel Frequency Cepstral Coefficients (MFCC) are extracted for each frame, as previously described above with reference to Eqns. 1-6. The MFCC coefficients from this speech are then clustered into, for example, sixty-four groups depending on Euclidian distance using any suitable clustering method, such as, for example, the K-means clustering method or the hierarchical clustering method, and the mean, variance, and weight for each of the clusters are then calculated to form the UBM for the authorized user, as will now be explained in more detail below.

In one embodiment, a single GMM having sixty-four clusters or mixtures is used to generate the UBM. The selection of sixty-four mixtures is an arbitrary modeling parameter and may vary in other embodiments of the speaker dependent speech recognition algorithm. In generating the UBM from the single GMM, first sixty-four twelve-element vectors are randomly chosen as initial centroids of the sixty-four clusters or mixtures. Each of these centroid vectors has twelve elements because for each frame of speech from the user there is generated the twelve MFCC coefficients as previously described above with regard to Eqns. 1-6. These initial centroid vectors for the clusters or mixtures may be also chosen from training vectors generated from speech by the authorized user, as will be discussed in more detail below.

Once these initial centroid vectors for the clusters or mixtures have been selected, training vectors are generated while the authorized user is speaking. Each of these training vectors is a twelve-element vector including the twelve MFCC coefficients for a corresponding frame of speech from the user. These training vector are then clustered or grouped into one of the defined sixty-four clusters or mixtures. Each training vector is grouped or clustered with the centroid vector having the nearest Euclidian distance to it. The determination of the Euclidean distance between two vectors is well understood by those skilled in the art and thus, for the sake of brevity, will not be described in detail herein. This process continues for an amount of time deemed sufficient to capture enough training vectors, which are then clustered or grouped into one of the defined sixty-four clusters or mixtures, to generate the UBM for the authorized user.

Once a sufficient amount of time has passed or a sufficient number of training vectors have been captured and grouped, a mean, which is also a twelve-element vector, is calculated for each mixture or cluster from all the training vectors that have been grouped or clustered with the corresponding centroid vector for that cluster. Thereafter for each of the sixty-four clusters, and an updated centroid vector for that cluster is calculated from the mean. In one embodiment, the updated centroid vector for each cluster is set equal to the mean vector calculated for that cluster. This process is repeated until a measure of distortion each of the clusters falls below a threshold that is suitable for the application. In one embodiment, the measure of distortion for each cluster is the difference between the newly calculated centroid (i.e., the newly calculated mean vector) and the former centroid (i.e., the old mean vector or original randomly selected centroid vector). Once this different falls below a desired threshold the process stops, at which point the UBM for the authorized user has been generated.

Those skilled in the art will understand that the above described process of grouping or clustering the training vectors is known as "k-means clustering" or a "k-means clustering algorithm" and will also appreciate other conventional clustering algorithms may be used to group or cluster the training vectors to generate the UBM of the authorized user. In addition, in some embodiments the training described above in the form of capturing training vectors can be continuously or occasionally performed any time the authorized user is speaking into or in the vicinity of the electronic device containing the speaker dependent voice recognition algorithm, and the UBM for the user updated accordingly. Once initially trained, the present speaker dependent voice recognition algorithm itself could process speech vectors generated in response to a person speaking in the vicinity of the electronic device and determine whether the speaker is an authorized user of the electronic device, and only when this is true capture training vectors and update the UBM for the user accordingly. This processing and determination are discussed in more detail below.

Once the UBM for the authorized user has been generated as just described, a mean $m_i$ (sometimes designated $\mu$ herein), variance $v_i$ (sometimes designated $\sigma$ herein) and weight $w_i$ for each cluster are calculated. In other words, for each cluster a Gaussian distribution of the vectors in that cluster is assumed with the GMM, as will be appreciated by those skilled in the art. The weight $w_i$ of each cluster of the UBM is the ratio of the number of frames that "belong to" or are contained in that cluster (i.e., were used to determine mean $m_i$ of the cluster) and the total number of frames used to build the current version of the UBM. Consequently, if a lot of speech vectors (i.e., at this point training vectors) are close to the mean $m_i$ of a particular cluster then those vectors will be grouped into or clustered into that cluster. As a result, such a cluster will have a greater weight $w_i$ than a cluster having or containing fewer speech vectors (i.e., a cluster in which fewer of the speech vectors are close to the mean of the cluster).

In one embodiment, a default UBM may be provided in the event that there is no speech (i.e., no training vectors) of the authorized user available to develop the UBM of the authorized user's acoustic space. In such an embodiment, once an authorized user starts to speak on or in the vicinity of the electronic device containing the speaker dependent speech recognition algorithm, algorithm updates the default UBM clusters in the same was as discussed above while the authorized user speaks.

At this point, the UBM for the authorized user has been generated and now the next portion of the training phase is performed, namely the process of building or generating the word model or code-phrase model CPM. Recall, the code phrase can be a single word, multiple words, gibberish or another sound or sounds, so long as the authorized user can repeat the code phrase to gain access to the electronic device once configuration of the algorithm is completed. In this phase, the speaking of the code phrase by the user is used to modify the UBM to generate the code-phrase model CPM, as will now be explained in detail. The code-phrase model is similar in structure to the UBM but represents a narrow acoustic space of the authorized user corresponding to the user speaking the code phrase. Thus, to generate the CPM the speaker dependent speech algorithm modifies clusters of the UBM to generate the corresponding clusters for the CPM responsive to the user speaking the code phrase, as will now be described in more detail. The CPM is also a GMM but instead of being a GMM corresponding to general speech from the user, as is the case for the UBM, the CPM is a GMM for the code phrase.

In operation, in building or generating the CPM the speaker dependent speech recognition algorithm implements Eqns. 7-11 set forth below:

$$\text{new\_w}_i = \frac{\sum_t \alpha_i(t)}{T} \qquad (7)$$

$$\text{new\_m}_i = \frac{\sum_t \alpha_i(t) y_t}{\sum_t \alpha_i(t)} \qquad (8)$$

$$\text{new\_v}_i = \frac{\sum_t \alpha_i(t) y_t^2}{\sum_t \alpha_i(t)} - \text{new\_m}_i^2 \qquad (9)$$

$$\alpha_i(t) = \frac{w_i N(y_t; m_i, v_i)}{\sum_j w_j N(y_t; m_j, v_j)} \qquad (10)$$

$$N(x; \mu, \sigma^2) = \frac{1}{\sigma\sqrt{2\pi}} e^{-\frac{(x-\mu)^2}{2\sigma^2}} \qquad (11)$$

In Eqns. 7-11, i is the cluster index so where there are sixty-four clusters, as is the case for the embodiment being described, i=0-63 (or 1-64). The parameter $w_i$ in Eqns. 7-11 is a scalar value corresponding to the weight of the cluster i. The parameter $m_i$ is a vector and represents the mean of the cluster i, and may be referred to as a mean vector herein. The mean vector $m_i$ has twelve elements (i.e., twelve values representing the twelve MFCC coefficients for each frame of speech, as previously discussed above in more detail). Generally the mean vector $m_i$ has the same number of elements as are the number of MFCCs or other parameter utilized to represent each frame of speech. The parameter $v_i$ is the vector variance of the cluster i, where once again this vector has the same number of elements (e.g., 12 elements in the embodiment being described) as there are MFCCs per frame of speech.

The parameter $y_t$ in Eqns. 7-11 is the vector of the MFCCs for a single frame of code-phrase speech, where the index t=1-T (or 0-T-1) and value T is the total number of frames processed for one utterance of the code phrase. This vector may be referred to as a code-phrase vector $y_t$ or the frame t in the following description. The value of T will, of course, vary and be a function of the selected code phrase. A long code phrase will lead to a larger value of T and conversely a shorter code phrase will lead to a smaller value of T. In Eqns. 7-11, the parameter $\alpha_i(t)$ is a scalar occupation probability of the cluster i for the frame t. Thus, for each code phrase frame there is one value of the occupation probability $\alpha_i(t)$ for each cluster i, and since there are sixty-four clusters in the example being described (i=1-64) then there are sixty-four values for the occupation probability $\alpha_i(t)$ for each code phrase frame. The occupation probability $\alpha_i(t)$ is the probability that the frame t "belongs to" or "occupies" the cluster i. Furthermore, the index j in Eqns. 7-11 is also associated with the number of clusters, and j=1-TNC where TNC is the total number of clusters (e.g., sixty-four in the sample embodiment being described) or j=1-TNC. Finally, the parameter N is the Gaussian likelihood function N and is given by Eqn. 11, where the variable x is the input to the function, $\mu$ is the mean and $\sigma^2$ the variance for the function. The fact that these variables x, $\mu$ and $\sigma^2$ are scalars in Eqn. 11 and are vectors in Eqn. 10 is discussed in more detail below.

The operation of the speaker dependent speech recognition algorithm in utilizing the Eqns. 7-11 in generating the code-phrase model CPM will now be described in more detail. In this phase, the authorized speaker's cooperation is needed to both define the desired code phrase and also to carefully pronounce the code phrase several times. For example, the authorized speaker could be prompted to repeat his or her desired code phase five or ten times. As the authorized user speaks the desired code phrase, the algorithm generates a code-phrase vector $y_t$ for each frame t of speech generated responsive to the spoken code phrase. Recall, each code-phrase vector $y_t$ is a vector including twelve MFCCs that characterize the code-phrase speech in that frame t.

The algorithm then calculates for each such generated code-phrase vector $y_t$ the occupation probability $\alpha_i(t)$ of this vector for each cluster i according to Eqn. 10. Where there are sixty-four clusters in the code phrase model, as in the sample embodiment being described, then the algorithm calculates sixty-four values of the occupation probability $\alpha_i(t)$ for each code-phrase vector $y_t$ (i.e., for each frame t generated responsive to the user speaking the code phrase). There is accordingly one occupation probability $\alpha_i(t)$ for each cluster that gives the probability that the respective code-phrase vector $y_t$ being processed is contained in or occupies that particular cluster.

As mentioned above, code-phrase vector $y_t$, mean vector $m_i$, and variance vector $v_i$ of Eqn. 4 are vectors while the Gaussian likelihood function N of Eqn. 11 is calculated as a function of non-vector variables x, $\mu$, and $\sigma^2$. As a result, both the numerator and the denominator of Eqn. 4 are calculated once for each element of the vectors $y_t$, $m_i$, and $v_i$, and then these results are multiplied together to obtain the scalar value $\alpha_i(t)$. For example, $N(y_t; m_i, v_i)$ is calculated for the first elements of the vectors $y_t$, $m_i$, and $v_i$, then for the second elements of these vectors, then the third elements, and so on. Then after these values for the function N have been calculated for each element of these vectors $y_t$, $m_i$, and $v_i$, the values of N resulting from each of these calculations are multiplied together to yield the occupation probability $\alpha_i(t)$ for the cluster i and frame t containing the code-phrase vector $y_t$ being processed.

Once the algorithm has calculated all t=1-T values of $\alpha_i(t)$ for each cluster i (i.e., an occupation probability for each code-phrase vector $y_t$ for each cluster i), the algorithm then calculates the scalar new weight new_$w_i$, the new mean vector new_$m_i$, and the new vector variance new_$v_i$ for each cluster i according to Eqns. 7-9. In Eqn. 9 the variables "$y^2t$" and "new_$m_i^2$" denote a squaring of each element of these vectors on an element by element basis.

The authorized user repeats the code phrase an arbitrary or set number of times (e.g., five times) as previously mentioned, and the algorithm repeats the above process each time that the authorized user speaks the code phrase. The user need not wait until processing is completed on a respective utterance of the code phrase. Input of the code phrase could be handled in this manner, with the user speaking the code phrase and then being prompted to speak it again, and then again, until the required number of utterances have been captured. Instead, the user could just be prompted initially to repeat the code phrase a certain number of times or continually until prompted to stop, and the algorithm may distinguish the start and finish of each utterance of the code phrase by the naturally occurring period of silence between utterances.

After the completion of the above process the algorithm has generated, and stores, the code-phrase model CPM, which is a GMM model of the authorized user's acoustic space for the code phrase. The CPM, like the UBM generated above, is formed by the final values of the weight $w_i$, vector mean $m_i$, and vector variance $v_i$ as calculated through Eqns. 7-11. The UBM is a GMM of the authorized user's general acoustic space while the CPM is a GMM of the authorized user's code-phrase specific acoustic space. The CPM accordingly has the same number of mixtures or clusters, namely sixty-four in the example embodiment being described, as does the UBM, with each cluster again being characterized by the same parameters $w_i$, $m_i$, and $v_i$.

The above-described process of generating the CPM is a maximum likelihood estimation approach using an Expectation Maximization (EM) algorithm, as will be appreciated by those skilled in the art. Besides the EM algorithm other maximum likelihood estimation methods may be utilized for generating the CPM from the UBM in other embodiments, and other methods can also be utilized to derive the CPM, as will also be appreciated by those skilled in the art.

Through Eqns. 7-11 the UBM is modified using the frames t (i.e., speech vectors) generated for each utterance of the code phrase by the authorized user. This modification may be understood as follows. Eqn. 10 is initially calculated for each cluster i (sixty-four in the example embodiment being described) of the UBM model previously generated. In the first iteration of Eqn. 10, the equation determines the value of the occupation probability $\alpha_1(t)$ (i=1), where from the equation it is seen that the numerator corresponds to the likelihood that the code-phrase vector $y_t$ of frame t is contained in the cluster 1 while the denominator is the total likelihood that this code-phrase vector is contained in any of the clusters j=1-64. In this way, the occupation probability $\alpha_1(t)$ indicates the likelihood that code-phrase vector $y_t$ of frame t is contained in cluster 1. Next, Eqn. 10 calculates this same variable for the next code-phrase vector $y_{t+1}$ (i.e., for frame t+1), meaning the likelihood that this frame t+1 vector is contained in cluster 1 is calculated. This is then done for the next code-phrase vector $y_{t+2}$, then vector $y_{t+3}$ and so on until the occupation probability of $\alpha_1(T)$ for cluster 1 is calculated for the final code-phrase vector vector $y_T$. Thus, at this point the occupation probability $\alpha_1(t)$ that each of the code-phrase vectors vector $y_t$ is contained in cluster 1 has been calculated. Once this has been done for cluster 1, Eqn. 10 is then evaluated in this same way to generate the occupation probabilities $\alpha_2(1)$-$\alpha_2(T)$ that each of the frames t=1-T (i.e., code-phrase vectors vector $y_1$-$y_T$) is contained in cluster 2. This is then done for cluster 3, cluster 4, and so on until the occupation probabilities $\alpha_{64}(1)$-$\alpha_{64}(T)$ that each of the code-phrase vectors $y_1$-$y_T$ is contained in cluster 64 have been calculated.

At this point, Eqn. 10 has been calculated to provide the occupation probabilities $\alpha_i(t)$ for each of the code-phrase vectors $y_t$ for each of the clusters i=1-64. Thus, Eqn. 10 indicates the likelihood that each code-phrase vector $y_t$ is contained in or occupies each cluster i. The occupation probabilities $\alpha_i(t)$ are then used to modify the three parameters that define each of the clusters i of the CPM, namely the weight $w_i$, mean $v_i$, and variance $v_i$. Eqn. 7 sets the new weight new_$w_i$ of each cluster i equal to the mean of the occupation probabilities $\alpha_i(t)$ for all the frames t or code-phrase vectors $y_t$ for that cluster. For example, the new weight new_$w_i$ for cluster 1 is set equal to $(\alpha_1(1)+\alpha_1(2)+\alpha_1(3) \ldots +\alpha_1(T))/T$, namely the average of all the occupation probabilities for all the code-phrase vectors $y_t$ for cluster 1. The new weights new_$w_i$ for the clusters 2-64 are then calculated in this way using Eqn. 7.

Having calculated the new weights weight new_$w_i$, the algorithm then evaluates Eqn. 8 for each cluster i=1-64 to generate a new mean new_$m_i$ for the cluster using the calculated occupation probabilities $\alpha_i(t)$ (Eqn. 10) for that cluster i. As seen from Eqn. 8, the new mean new_$m_i$ is the weighted average of all the likelihoods that each of the code-phrase vectors $y_t$ is contained in each cluster I, where the code-phrase vectors $y_t$ are weighted by the occupation probabilities $\alpha_i(t)$ for that cluster. Thus, for cluster 1 the new mean equals new_$m_1$=$(\alpha_1(1)y_1+\alpha_1(2)y_2+\alpha_1(3)y_3 \ldots \alpha_1(T)y_T)/(\alpha_1(1)+\alpha_1(2)+\alpha_1(3) \ldots +\alpha_1(T))$. The new means new_$m_2$-new_$m_{64}$ for the remaining clusters 2-64 are then calculated in the same way using Eqn. 8. Finally, the new variance new_$v_i$ of each cluster i=1-64 is calculated using Eqn. 9. As seen in Eqn. 9, the new variance new_$m_i$ is a similarly weighted average of all the variances utilizing the new mean new_$m_i$ just calculated with Eqn. 8.

The final portion of the training phase is the generation of a Longest Common Subsequence or Sequence (LCS) template from the CPM, as will now be described in more detail. The CPM, which is a GMM as is the UBM from which the CPM is derived, has no temporal component as previously mentioned. Accordingly, the speaker dependent speech recognition algorithm must further develop a temporal component to distinguish between the authorized user speaking a phrase that has the same spectral properties but different temporal properties and the trained code phrase. For example, if the trained code phrase is "Turn on mobile phone" then the algorithm needs a way to distinguish between the trained code phrase "Turn on mobile phone" and a similar phrase such as "Mobile phone turn on." These two code phrases have the same spectral components but different temporal components.

To enable the distinction between such similar phrases to be determined, the algorithm generates a Longest Common Subsequence (LCS) template, as will now be described in more detail. In generating the LCS template, the algorithm utilizes values that have been calculated in generating the occupation probabilities $\alpha_i(t)$ in Eqn. 10. In examining the denominator of Eqn. 10 more closely, this denominator is the total likelihood that the code-phrase vector $y_t$ being processed is contained in any of the clusters j=1-64. For each code-phrase vector $y_t$, one of the values of this summation term in the denominator of Eqn. 10 will have the highest value. This highest value is the cluster j that is the cluster most likely to contain the current code-phrase vector $y_t$ being processed. Eqn. 10 includes this highest value for each of the code-phrase vectors $y_t$-$y_T$ for the code-phrase. From these highest values for each code-phrase vector $y_t$ the LCS template is built. So there are T elements in the LCS template. If, for example, the authorized user's utterance of the code phrase ends up being 100 frames long (i.e., T=100 and code-phrase vectors $y_1$-$y_{100}$) then the LCS template is also 100 elements long.

The LCS template accordingly is built or generated by selecting for each frame t or code-phrase vector $y_t$ of the code phrase being trained the highest value summation term in the denominator of Eqn. 10, which is the cluster j having the highest likelihood of containing that code-phrase vector $y_t$ or frame t. Thus, the LCS template contains an element for each frame t=1-T (i.e., code-phrase vector $y_1$-$y_T$) of the code phrase being trained. Recall the authorized user repeats the desired code phrase several times and the algorithm in one embodiment utilizes the highest summation term based on the most recent values of $w_i$, $m_i$, and $v_i$ and generates the corresponding portion of the LCS template.

Upon generation of the LCS template, the algorithm has completed building or generation of the required components of the algorithm. Next, the algorithm operates in the testing phase to determine whether a test utterance by a user is from an authorized user and is the proper code phrase, as will now be explained in more detail. In doing so the algorithm utilizes the following equation:

$$\text{GMM\_likelihood} = \sum_{m=1}^{M} w_m N(x; \mu_m \sigma_m^2) \quad (12)$$

Once again $N(x;\mu,\sigma^{-2})$ is the Gaussian likelihood as previously defined by Eqn. 11. In operation during the testing phase, a test utterance is detected by the algorithm, typically through a user speaking the test utterance, and the corresponding speech signal is digitized and processed on a per-frame-basis as previously described to provide a number of speech vectors $y_t$, each speech vector including the MFCCs for the corresponding window of the test utterance signal as also previously discussed above.

Once the speech vectors $y_t$ have been generated from the frames t of the test speech, the algorithm operates in the testing phase to initially calculate Eqn. 12 for each of the UBM and CPM. In Eqn. 12, m is the cluster index and M is the total number of clusters and these are thus equivalent to the other cluster indices i and j used in the Eqns. 7-10. In comparing Eqn. 12 to the denominator of Eqn. 10, it is seen that these are essentially the same equations. The variable x in Eqn. 12 represents the test speech vectors $x_t$ that have been generated for the test speech (i.e., $x_1$-$x_T$ where T is the total number of frames for the test utterance signal). As previously discussed above in relation to the denominator of Eqn. 10, Eqn. 12 indicates the overall probability or likelihood that each speech vector is contained in any of the clusters m=1-64.

In contrast to the denominator of Eqn. 10, however, in Eqn. 12 the results of the calculation of the equation for each test speech vector $x_1$-$x_T$ are then multiplied together to yield an overall probability or likelihood for the test speech. This is done for both the UBM and the CPM. So for example, first Eqn. 12 is evaluated for the CPM. Starting with cluster 1 Eqn. 12 is evaluated for vector $x_1$ (frame 1), then for vector $x_2$ (frame 2), then for vector $x_3$ (frame 3), and so on through vector $x_T$ (frame T), with the results of each of these evaluations then being multiplied together to yield an overall probability or likelihood that these vectors are contained in cluster 1. The same is then done for cluster 2, then cluster 3, and so on through the final cluster M (sixty-four in the embodiment being described). These likelihoods for each cluster m=1-64 are then added together to provide an overall likelihood GMM_likelihood_CPM that the test speech came from or corresponds to the code-phrase word model CPM. The same is then done for the UBM, namely Eqn. 12 evaluated for all the test speech vectors $x_t$ for each cluster 1-64 to provide an overall likelihood GMM_likelihood_UBM that the test speech came from or corresponds to the universal background model UBM of the authorized user.

If both the likelihoods GMM_likelihood_CPM and GMM_likelihood_UBM are below respective arbitrary thresholds, then the algorithm determines that the test utterance originated from a source other than an authorized user, and the electronic device including the algorithm is controlled accordingly. When at least one of the likelihoods GMM_likelihood_CPM and GMM_likelihood_UBM exceeds its corresponding threshold, then the algorithm computes a log-likelihood ratio (LLR) equal to the likelihood for the CPM minus the likelihood for the UBM. If the LLR is negative, meaning the likelihood of test utterance coming from the UBM is greater than it coming from the CPM, the algorithm determines that although the analyzed speech may be from the authorized user, the user did not speak the proper code phrase. When the LLR is positive, which means the likelihood of the test utterance coming from the CPM is greater than it coming from the UBM, the algorithm determines that the test utterance is from the authorized user and that the user may have spoken the proper code phrase.

In this case, the algorithm next compares the indices of the highest value summation components of the denominator of Eqn. 10 for each frame t of the test utterance to the LCS template. This comparison is done in temporal order meaning initial frame t of the test utterance is compared to the initial element of the LCS template, the next frame t+1 to the second element of the LCS template, and so on through the final frame T of the test utterance and final element of the LCS template. Each comparison thus determines whether the cluster m indicated as most likely to contain the respective frame t of the test utterance is the same cluster as stored in the LCS template for the corresponding frame t of the code phrase. When the indices (i.e., cluster indicated as most likely to contain the corresponding frame t of the test utterance) yielded by the test utterance speech the indices of the LCS template in order, then the algorithm determines that the authorized user has spoken the code phrase. At this point, the electronic device executing the algorithm takes the action associated with receipt of the code phrase, such as "waking up" if the device was operating in a low power sleep or standby mode, entering another operating mode, and so on.

In the above-described speaker dependent speech recognition algorithm, optimization strategies can be employed to reduce the number of calculations that must be performed in executing the algorithm. First, the code phrase model CPM components that need to be computed can be reduced. Because the algorithm is only interested in identifying the code phrase, the components (i.e., clusters) which are not part of the code phrase can be excluded from the computations. The list of the relevant components (i.e., clusters) can be obtained from the LCS template since the template is effectively a list of the best performing components or clusters associated with the code phrase. A second optimization strategy is a fast rejection during the during the GMM_likelihood computation of the testing phase. Since the GMM_likelihood is calculated for each frame t, it is possible to reject the test utterance if it has not met a certain threshold within the first few frames t. This threshold and the specific number of frames can be determined during training phase by identifying the point where the CPM starts to significantly differ from the UBM.

Finally, the speaker dependent speech recognition algorithm may include a learning phase to improve the performance of the recognition achieved by the algorithm. During usage of the electronic device and execution of the algorithm, whenever the valid code phrase is detected the associated code-phrase vectors can be used to improve the CPM. This process is similar to the expectation maximization EM utilized during the training phase as described above, but now is done using the recently acquired speech sample corresponding to the code phrase being spoken by the authorized user.

Further improvement can be done by making the system collect statistics on template replacement. Up to now, the similarity score is based on the longest common sequence (LCS) between the test and the template. Only an exact match is given value. This method gives no penalty to replacement (non-matching), insertion and deletion (when tested sequence is longer or shorter). With more usage, it is possible to collect the replacement that happens. For example, if there were two close by points that were matching between the template and test, the system could assume that the replacement of the stage in between them are common, and should be given value as well. Once enough statistics can be collected from here, the scoring by LCS method can be altered with that of edit distance.

Additional embodiments are within the scope of the present disclosure. For example, in one embodiment to distinguish a code phrase such as "my phone" from this same phrase being used in normal speech (e.g., "Jim broke my phone, can you help me fix it?"), the algorithm may determine that the user spoke the code phrase only if the code phrase is separated from other sounds at its beginning and at its end by periods of silence, where the periods may have a length suitable for the application. Furthermore, in another embodiment, to increase the reliability of the algorithm, even if the LLR is positive, the algorithm may not determine that the authorized user is speaking unless the positive LLR exceeds a threshold that is suitable for the application. Computational time, resources, and device power may also be improved as mentioned above by determining the GMM likelihood for each frame by calculating only the component of the denominator of Eqn. 10 corresponding to the cluster i that yielded the highest value for the CPM as stored in the LCS template. In addition, the LLR may be computed and updated per frame, so that if after a number of frames suitable for the application the LLR is not positive or does not exceed a suitable threshold, the algorithm may determine that the analyzed portion of the test utterance is not the code phrase and stop further computations to recognize the code phrase to thereby save power.

Furthermore, referring to FIG. 4, the algorithm may not require an exact match between the LCS template and the result of the temporal analysis of the test utterance to find that the authorized user has spoken the code phrase. For example, a difference between the LCS template and the text utterance may be calculated and possibly weighted as shown in FIG. 4. The algorithm may determine that the authorized user has spoken the code phrase if the difference is less than a suitable threshold, where such differences between the test utterance result and the LCS template may be due to the user speaking the code phrase with, e.g., a slightly different accentuation, from one time to the next. Therefore, using this alternative can reduce or eliminate the times that the algorithm improperly rejects the code phrase because the authorized user may have spoken the code phrase differently than in the past (e.g., with more emotion). Moreover, if the algorithm detects that an authorized user has spoken the code phrase then the algorithm may update the CPM pursuant to Eqns. 7-11 in response to the spoken code phrase such that the CPM effectively continues to "learn," as mentioned above.

Figure 8:
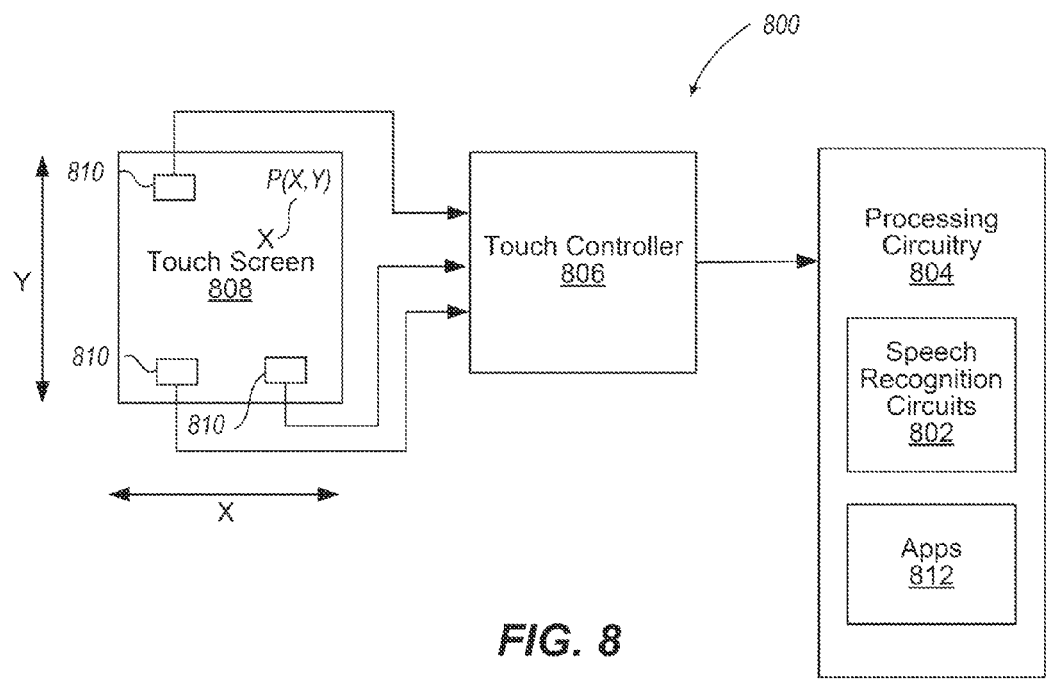
FIG. 8 is a functional block diagram of an electronic device including speech-recognition circuitry according to one embodiment of the present disclosure.

FIG. 8 is a functional block diagram of an electronic device 800 including speech-recognition circuitry 802 contained in processing circuitry 804 according to one embodiment of the present disclosure. The speech recognition circuitry 802 corresponds to circuitry and/or software that executes the speaker dependent voice recognition algorithms described above with reference to FIGS. 1-7. The processing circuitry 804 may be any suitable processing circuitry, such as a microprocessor where the electronic device 800 is a personal computer or an applications processor where the electronic device is a smartphone or tablet computer. Similarly, the touch controller 806 may include any suitable digital and/or analog circuitry to perform the desired functions of the controller.

The electronic device 800 includes a touch controller 806 that detects the presence of touches or touch points P(X,Y) and gestures including such touch points on a touch screen 808 that is coupled to the controller. The touch screen 808 has a number of touch sensors 810 positioned on the touch screen to detect touch points P(X,Y), with only three touch sensors being shown merely to simplify the figure. The touch controller 806 controls the touch screen 808 to detect a user's finger, stylus, or any other suitable device, all of which will collectively be referred to as a "user device" herein. The detection of the user device at a particular location on the touch screen 808 is defined as a touch point P(X,Y) on the touch screen. An X-axis and Y-axis are shown in FIG. 1, with the X coordinate of a touch point P(X,Y) corresponding to a point along the X-axis and the Y coordinate to a point along the Y-axis. The touch sensors 810 generate corresponding sensor signals responsive to a touch point P(X,Y) and provide these signals to the touch controller 808 for processing. The touch sensors 810 are typically contained in some sort of transparent sensor array that is part of the touch screen 808, the detailed structure of which is understood by those skilled in the art and thus will not be described herein. The number and location of the touch sensors 810 can vary as can the particular type of sensor, such as ultrasonic, resistive, vibration, or capacitive sensors.

The processing circuitry 804 is coupled to the touch controller 102 and is operable to execute applications or "apps" 812 designed to perform a specific function or provide a specific service on the electronic device 800. Where the electronic device 800 is a cellular phone or a tablet computer, for example, the applications 812 can include a wide variety of different types of applications, such as music applications, email applications, video applications, game applications, weather applications, reader applications, and so on. The touch controller 806 reports touch information to the applications 812, which operate in response thereto to control operation of the application and/or the electronic device 800.

The electronic device 800 can be any kind of suitable electronic device or system. The device 800 need not include the touch screen 808 and can include additional components not expressly illustrated in FIG. 8. For example, the electronic device 800 could be a personal computer system, desktop or laptop, a television, a home-theater system, a smart appliance, a vehicle such as a car or truck where the algorithm is used in lieu of a key to access, activate, and deactivate the vehicle, a security system that provides or denies the speaker access to a facility, and so on.

In one embodiment, the electronic device 800 operates in a sleep or low-power mode of operation and the speaker dependent voice recognition algorithm executes during this mode to detect the utterance of the code phrase by an authorized user or users. The low-power mode is a mode of operation that is common in electronic devices in which at least some of the electronic components in the device are powered down or placed in an alternate state to reduce the power consumption of these components and thereby reduce the overall power consumption of the electronic device. In response to detecting the code phrase, the electronic device 800 is then "activated" or leaves the low-power mode of operation. For example, where the device 800 is a smart phone, when the algorithm detects the utterance of the code phrase by an authorized user the home screen or some other screen is then displayed to give the speaker access to and allow him or her to operate the device.

One skilled in the art will understood that even though various embodiments and advantages have been set forth in the foregoing description, the above disclosure is illustrative only, and changes may be made in detail, and yet remain within the broad principles of the invention. For example, some of the components described above may be implemented using either digital or analog circuitry, or a combination of both, and also, where appropriate, may be realized through software executing on suitable processing circuitry. The code phrase may be in any language, not just English, and could even be gibberish or a random sequence of sounds or a sound desired defined by the user. Therefore, the present disclosure is to be limited only as defined by the appended claims and any such later-introduced claims supported by the present disclosure.

What is claimed is:

1. A method of speaker dependent speech recognition, comprising:
    building a universal background model (UBM) for a user responsive to unknown speech from only the user;
    adapting the universal background model (UBM) to build a single Gaussian Mixture Model (GMM) responsive to a registration code phrase spoken by the user and using the single GMM to generate a code-phrase model (CPM) for the user;
    generating a longest common sequence (LCS) template for the user from the code-phrase model (CPM), wherein the LCS template is represented by a sequence of an index of a best performing component of the single GMM;
    utilizing the universal background model (UBM), code-phrase model (CPM) and longest common sequence (LCS) template to determine whether the user is an authorized user and has spoken the registration code phrase, the utilizing including,
    capturing a test code phrase;

accepting the test code phrase as being spoken by the authorized user when the log likelihood ratio between the code-phrase model (CPM) and the universal background model (UBM) is positive; and comparing the Longest Common Sequence (LCS) template with a test code-phrase template for the captured test code phrase.

2. The method of claim 1 wherein building the universal background model (UBM) includes using the k-means clustering method.

3. The method of claim 1 wherein adapting the universal background model (UBM) responsive to the registration code phrase spoken by the user to generate the code-phrase model (CPM) for the user includes using the registration code phrase with multiple expectation maximization iteration.

4. The method of claim 1 wherein capturing a test code phrase comprises generating a test code-phrase template including a sequence of indexes of best performing mixtures from the code-phrase model (CPM).

5. The method of claim 4 wherein generating the test code-phrase template comprises finding a longest common sequence from the longest common sequence (LCS) template for the registered code phrase.

6. The method of claim 5 wherein comparing in temporal order setting a threshold of acceptance of the registration code phrase by finding its Longest Common sequence score against the test code phrase template.

7. The method of claim 1 wherein only a single Gaussian mixture of the code-phrase model (CPM) that is present in the registered code phrase template is checked for output probability.

8. The method of claim 1 wherein the code-phrase model (CPM) is continuously updated using captured speech frames that have a high confidence value of belonging to the registered code phrase.

9. The method of claim 1 wherein building a universal background model (UBM) for the user responsive to unknown speech from the user comprises using an electronic device as a phone and capturing the unknown speed from the user while the user is using the electronic device as a phone.

10. An electronic device, comprising:
a touch screen;
a touch screen controller coupled to the touch screen; and
processing circuitry including speech recognition circuitry, the speech recognition circuitry configured to execute a speaker dependent voice recognition algorithm that is configured to:
build a Gaussian mixture model (GMM) universal background model (UBM) for a user responsive to unknown speech from only the user;
build a code-phrase model (CPM) for the user, the code-phrase being built from a single Gaussian Mixture Model (GMM) adapted from the universal background model (UBM) responsive to a registration code phrase spoken by the user;
generate a longest common sequence (LCS) template for the user from the code-phrase model (CPM), wherein the LCS template is represented by a sequence of an index of a best performing component of the single GMM; and
determine whether the user is an authorized user and has spoken the registration code phrase based on the universal background model (UBM), code-phrase model (CPM) and longest common sequence (LCS) template, the processing circuitry further configured to;
capture a test code phrase;
accept the test code phrase as being spoken by the authorized user based upon the log likelihood ratio between the code-phrase model (CPM) and the universal background model (UBM) being positive; and
compare the Longest Common Sequence (LCS) template with a test code-phrase template for the captured test code phrase.

11. The electronic device of claim 10 wherein the speech recognition circuitry is further configured to grant access to the electronic device when the user is determined to be an authorized user that has spoken the proper registration code phrase, and to deny access to the electronic device otherwise.

12. The electronic device of claim 11 wherein the electronic device is one of a smartphone, tablet computer, and personal computer.

13. The electronic device of claim 10 wherein the speech recognition circuitry is configured to execute the speaker dependent voice recognition algorithm during a low power mode of operation of the electronic device.

* * * * *